United States Patent [19]

Cooper

[11] Patent Number: 4,913,717
[45] Date of Patent: Apr. 3, 1990

[54] METHOD FOR FABRICATING BURIED WAVEGUIDES

[75] Inventor: Alfred R. Cooper, Cleveland, Ohio

[73] Assignee: Polaroid Corporation, Cambridge, Mass.

[21] Appl. No.: 300,571

[22] Filed: Jan. 23, 1989

[51] Int. Cl.[4] .............................................. C03C 21/00
[52] U.S. Cl. ................... 65/30.13; 65/60.7; 65/111
[58] Field of Search ............... 65/30.13, 30.14, 60.7, 65/111

[56] References Cited

U.S. PATENT DOCUMENTS

| | | | |
|---|---|---|---|
| 3,836,348 | 9/1974 | Sumimoto et al. | 65/30.13 |
| 3,857,689 | 12/1974 | Koizumi et al. | 65/30.13 |
| 3,880,630 | 4/1975 | Izawa | 65/30.14 |
| 4,155,735 | 5/1979 | Ernsberger | 65/30.13 X |

FOREIGN PATENT DOCUMENTS 60-260445  12/1985  Japan .................................. 65/30.13

Primary Examiner—Robert L. Lindsay
Attorney, Agent, or Firm—Francis J. Caufield

[57] ABSTRACT

A method for fabricating buried waveguides on a glass substrate which contains sodium ions includes the steps of masking the substrate, performing a field-assisted ion-exchange process at low temperature to form waveguides by exchanging silver ions for the sodium ions, and performing a field-assisted ion-exchange at low temperature to bury the waveguides by exchanging potassium ions. In a preferred embodiment, the silver ions and the potassium ions are exchanged from eutectic melts.

4 Claims, 2 Drawing Sheets

METHOD FOR FABRICATING BURIED WAVEGUIDES

TECHNICAL FIELD OF THE INVENTION

The present invention, in general, relates to methods for fabricating buried waveguides and, in particular, to a method of fabricating buried waveguides by means of a field-assisted ion-exchange process.

BACKGROUND OF THE INVENTION

Waveguide devices that involve transmission and manipulation of optical signals typically have a main, signal carrying region which has a higher index of refraction than that of the phases on either side of it. In such waveguide devices formed on soda-lime-silicate glass substrates, the region having a higher index of refraction is usually fabricated by exchanging for sodium, cations of higher molar refractivity than sodium as, for example, silver ions and large alkali ions such as potassium, rubidium, caesium, and thallium. In addition, in such waveguide devices, it is well known that there is an advantage in having: (1) fairly sharp boundaries between the higher index of refraction region and its neighbors; (2) minimal optical absorption in the signal-carrying, higher index of refraction region; and (3) a signal-carrying, higher index of refraction region which is buried deeply enough beneath the free surface of the glass substrate that scattering from surface irregularities and defects does not disturb the signal.

U.S. Pat. No. 3,880,630 issued on April 29, 1975 discloses a method for forming buried optical waveguides in glass substrates by means of a field-assisted ion-exchange process. In accordance with the teaching of the patent, buried waveguides are formed in a glass substrate by a first step of diffusing with the aid of an electric field ions having a large electronic polarizability per unit volume to produce a localized region of higher refractive index than the remainder of the material and by a second step of migrating the region of higher index of refraction to a desired depth by diffusing ions having a small electronic polarizability per volume again with the aid of an electric field. Further, the patent teaches that silver ions may be used as the first ions to be diffused into the dielectric substrate in the first step and that potassium ions may be used as the second ions to be diffused into the substrate in the second step. Still further, the patent teaches the use of masks to delineate the waveguides. Yet still further, the patent teaches the diffusion of the first and second ions from molten salt baths or from first and second layers of materials which are successively formed on the substrate. A further difficulty arises because the boundary between the exchanged layer and the unexchanged region does not remain planar. This occurs because the current distributes itself in a manner so as to diminish the resistance no matter what type of mask is used.

In addition, the patent teaches that the diffusions are to be carried out at relatively high temperatures just below the softening point of the substrate. In fact, the patent refers to 350° C. as a relatively low temperature. This teaching to use relatively high temperatures causes a problem notwithstanding the fact that the high molar refractivity of the silver ion makes it an attractive candidate for use in forming waveguides. The problem arises because the negative free energy of formation of $Ag_2O$ is a small value. As a result, some silver ions tend to be reduced to silver metal and this tendency increases with temperature. This is a problem because metallic silver atoms increase optical absorption and can prevent silver oxide rich layers in soda-lime-silicate glass from being useful signal carriers in many applications.

SUMMARY OF THE INVENTION

The present invention is a method for fabricating buried waveguides on a glass substrate that contains sodium ions, the waveguides having sharp, well-defined boundaries which are easily controlled. In particular, an embodiment of the present invention is a method for fabricating buried waveguides in a glass substrate which contains alkali ions, which method comprises the steps of: masking the glass substrate; forming a waveguide by field-assisted ion exchange of silver ions from a silver film at a temperature just above the melting point of an alkali containing salt; and burying the waveguide by field-assisted ion exchanging potassium ions from a potassium salt at a temperature just above the melting point of the salt. Further, the electric field is created by applying a DC potential to a pair of electrodes disposed on opposite sides of the substrate, the anode or positive terminal being disposed adjacent the substrate surface into which the ions from the salt are being driven.

It is important to maintain a low temperature for both field-assisted ion-exchange steps to diminish the chance of reduction of the silver ions. For example, in one embodiment of the present invention, the silver exchange is carried out at a temperature of approximately 210° C. Because a low temperature is required to avoid silver reduction, the mobility of the ions is very low and an electric field is used to enhance the rate of exchange. Further, in a preferred embodiment of the present invention, the temperature of the exchange can be further reduced by using eutectic combinations. In particular, the first step of silver exchange can be carried out using a $(NH_4-Ag)NO_3$ eutectic melt. Because of the nearly equivalent mobilities of silver and sodium in soda-lime-silicate glass, the boundary between the silver layer and the sodium in the substrate is fairly sharp.

After the silver exchange, the substrate is cooled and the silver salt or eutectic silver salt combination is removed before the substrate is introduced into a molten potassium melt, again at a low temperature. Further, in a preferred embodiment, the substrate is introduced into a eutectic composition of $(Ca-K)NO_3$ to ensure that a lower temperature can be used. Because potassium is far more mobile than calcium is in soda-lime-silicate glass, it is the only ion exchanged from the salt. On the other hand, potassium is much less mobile than silver and produces, therefore, a sharp concentration distribution at the silver-potassium interface.

As discussed above, the low temperatures used for both ion exchange steps can be made even lower by advantageously performing ion exchange from eutectic melts. This further diminishes the possibility of reduction of the silver ions. In addition, the fact that the ion exchange takes place from an anode advantageously assures that any excess electrons that could cause reduction of the silver ion will be removed. As a result, the method of the present invention advantageously provides relatively sharp layers of high index glass doped with univalent silver ions in which the silver is maintained as a univalent cation.

In a further embodiment of the present invention which advantageously provides sharper lateral definition for the buried waveguides, silver metal films are deposited or formed on the surface of the glass sheet into which the ions from the salts are driven with a molten sodium salt which permits sodium ions to be driven into the glass simultaneously with the silver ions. Since there is only a slight difference in mobility of $Na^+$ and $Ag^+$ ions in soda lime silica glass, the electric field in the glass remains normal to the glass surface and the $Ag^+ Na^+$ boundaries remain sharp. The configuration of the silver film can be chosen as desired.

BRIEF DESCRIPTION OF THE DRAWINGS

The present invention may be understood by considering the following detailed description together with the accompanying drawings, in which.

To facilitate understanding, identical reference numerals are used to designate elements common to the figures.

DETAILED DESCRIPTION

Figure 1:
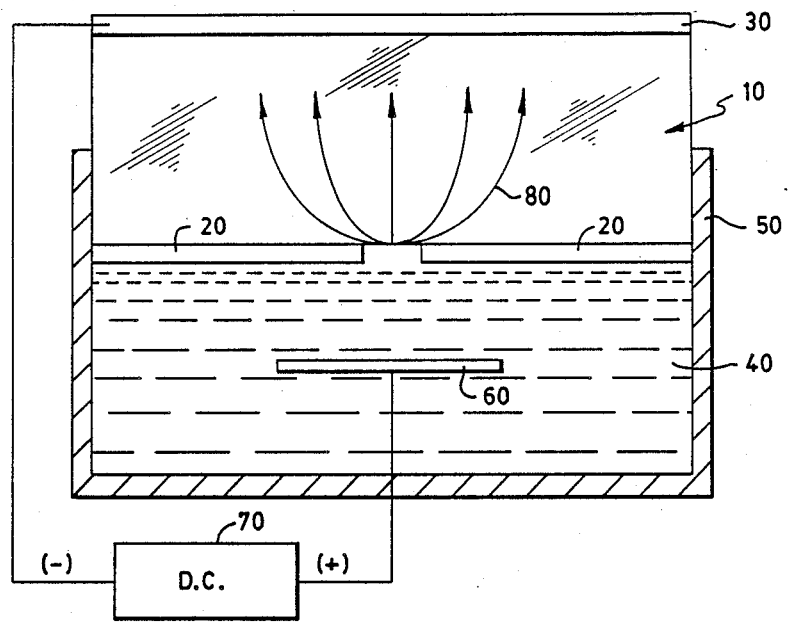
FIG. 1 shows, in pictorial form, an elevational view of a glass substrate immersed in a molten salt bath at an intermediate step of the inventive method.

The following describes an embodiment of the inventive method with reference to FIG. 1. A layer of masking material is deposited or formed in accordance with methods well known to those of ordinary skill in the art on a surface of substrate 10, for example, Microsheet TM soda-lime-silicate glass obtained from Corning Glass. The layer of masking material is then photolithographically etched in accordance with methods well known to those of ordinary skill in the art to form mask 20. The masking material is impervious to diffusion of silver and potassium ions. Typical masking materials are: (1) divalent or trivalent metals which do not have as high a mobility as silver and (2) oxides which are impervious to diffusion of potassium such as $SiO_2$. In particular, a diffusion mask may be fabricated from anodized aluminum or iron. Further, anodized aluminum may be fabricated by exposing aluminum to oxyalic acid at room temperature.

Masked substrate 10 has an electrode 30 affixed to the opposite side thereof from mask 20 by, for example, metal deposition or epoxy. Then masked substrate 10 is immersed in a molten silver salt bath 40 in a vessel 50. Electrode 60 is placed in molten salt bath 40 opposite mask 20 to serve as a positive electrode. Then a DC voltage from a DC supply 70 is applied across electrodes 30 and 60 to produce an electric field. The positive terminal of DC supply 70 is connected to electrode 60 in bath 40 and the negative terminal is connected to electrode 30 affixed to substrate 10. The electric field applied in accordance with the present invention has a magnitude in the range of fifty to a few hundred volts/mm.

Figure 2:
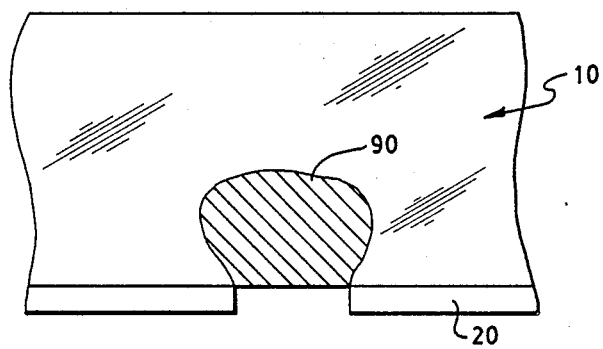
FIG. 2 shows, in pictorial form, an elevational view of an exchanged region in the substrate of FIG. 1.

The first step of this embodiment of the present invention is a silver exchange. To carry out this silver exchange, molten salt bath 40 is a silver salt such as $AgNO_3$, and vessel 50 is placed in an electric furnace, not shown, to maintain a temperature of approximately 210° C. In a preferred embodiment of the present invention, the temperature of the exchange can be reduced below 210° C. by using a eutectic melt such as, for example, $(NH_4-Ag)NO_3$. FIG. 2 shows at 90 the exchanged region following from this step.

Figure 3:
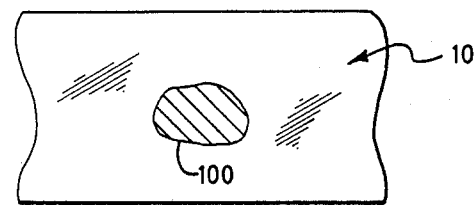
FIG. 3 shows, in pictorial form, an elevational view of the exchanged region of FIG. 2 buried further into the substrate of FIG. 1.

After the silver exchange, substrate 10 is cooled and the salt is removed. Then the voltage is again applied and substrate 10 is introduced into a molten potassium salt, for example, $KNO_3$, $Ca(NO_3)_2$, again at a low temperature, for example, 210° C., to form buried waveguides indicated at 100 in FIG. 3. Potassium ions from this melt are driven into the glass and, because potassium is far more mobile than calcium in soda-lime-silicate glass, it is the only ion exchanged from the salt. Further, because potassium is much less mobile than silver, it produces a sharp concentration distribution at the silver-potassium interface.

After the above-described steps of field-assisted ion exchange, mask 20 and electrode 30 are removed from substrate 10 in accordance with methods well known to those of ordinary skill in the art and the ends of the buried waveguides are fire-polished to provide good end-coupling. A fire-polished surface is preferred because it provides better coupling than that provided by a ground-polished surface.

It should be clear to those of ordinary skill in the art that the placement of electrodes 30 and 60 may be accomplished in any number of different ways.

Figure 4:
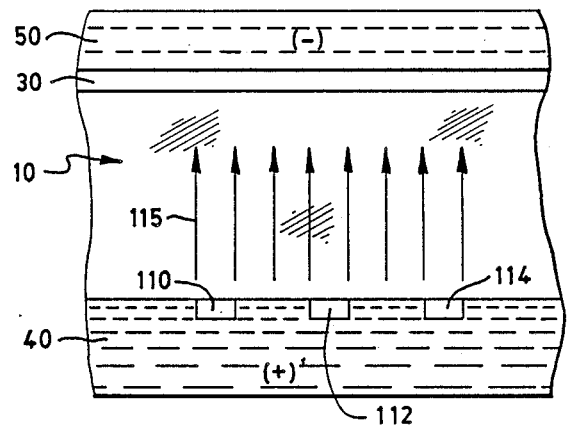
FIG. 4 shows, in pictorial form, a elevational view of a glass substrate at an intermediate step of the inventive method where electrodes have been formed on the surface of the substrate into which ions from the salts are driven, the electrodes having been formed along the lateral extent of the waveguides.
Figure 5:
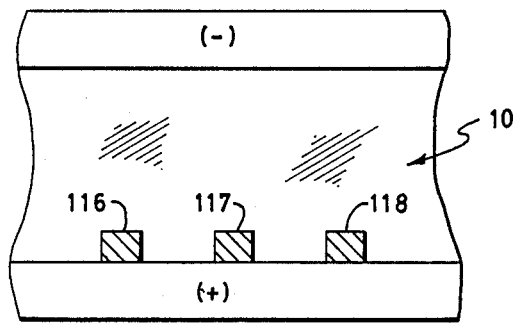
FIG. 5 shows, in pictorial form, an elevational view of the substrate of FIG. 4 after silver exchange and replacement of sodium salt with potassium salt.
Figure 6:
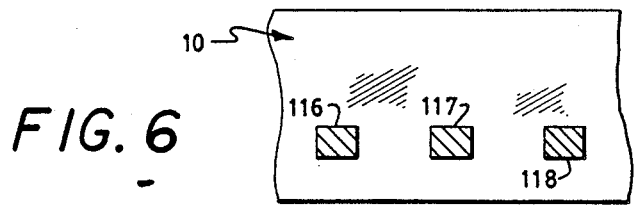
FIG. 6 shows, in pictorial form, the regions of FIG. 5 after exchange and burial of the silver exchanged regions of FIG. 5.

The following describes a further embodiment of the present invention with reference to FIGS. 4, 5, and 6. This method, which is used to obtain buried guiding regions with sharp boundaries, relies on the simultaneous diffusion of silver and sodium. Here, silver strips 110 to 114, about 1 micrometer thick, are deposited onto the surface of the glass substrate on which the waveguide is to be formed. This surface is brought into contact with a molten sodium containing salt which is connected to the cathode. The potential difference is then applied. At the silver strip, silver is ionized causing $Ag^+$ ions to enter the glass and be transported toward the cathode in response to the electric field. Elsewhere on the surface, sodium ions are caused to enter the glass and be transported toward the cathode in response to the electric field.

After the silver strips are consumed or after the integrated current reaches a predetermined value the potential difference ceases and any remaining silver metal adhering to the substrate is removed. Then $Ag^+$ ions are driven deeper into the glass by a second application of the electric field which allows $Na^+$ from a sodium salt or $K^+$ from a potassium salt to be driven into the glass substrate. In the first exchange step here, silver and sodium are allowed to diffuse simultaneously, and because they have nearly equal mobilities, the electric current lines (115 in FIG. 4) are normal to the surface. Hence, the equipotential planes are parallel to the surface. In accordance with this embodiment of the present invention, the fact that electrodes 110 to 114 are disposed along the lateral extent of the waveguides provides a sharper definition to the boundaries along that lateral extent. After the initial exchange step as previously set forth, exchanged regions 116 to 11B will have been formed as shown in FIG. 5. These regions are then buried with the second exchange step as illustrated in FIG. 6 where a potassium salt may be used instead of the sodium salt as in the first exchange step.

One potential problem that may arise as a result of the low temperature exchanges described above is that residual stresses may develop and cause bending of the substrate. A preferred method of accounting for this is to pre-exchange potassium ions into the surface of the substrate which is opposite the surface into which the waveguide is driven. This has the advantage of providing a more nearly symmetrical stress pattern and is preferred to a process of removing the stress by annealing after the waveguides have been formed because annealing runs the risk of bending the waveguides and of reducing the silver ions.

Clearly, those skilled in the art recognize that further embodiments of the present invention may be made without departing from its teachings. For example, it is known that in the presence of an electric field, the shape of the concentration distribution with depth depends on the relative mobility of the exchanging ion and the ion which is being removed from the opposite surface. For example, when the exchanging ion is slower than the ion being removed, a nearly step function distribution is obtained for the concentration of exchanged ions. In particular, potassium exchanged for sodium using a modest electric field gives a distribution that cannot be distinguished from a step function by ordinary electron microprobe analysis. Thus, all substrates in which the silver ion is intermediate in mobility between that of potassium and sodium should obtain a crisper concentration distribution than that achieved by the silver-sodium exchange in soda-lime-silicate glass described above. Therefore, it is intended that all matter contained in the above description or shown in the accompanying drawings shall be interpreted as illustrative and not limiting.

What is claimed is:

1. A method for fabricating buried waveguides in a multicomponent glass containing sodium ions, said method comprising the steps of:

masking the surface of the substrate over the widthwise boundaries of the waveguide;

placing the surface of the masked substrate in contact with a molten salt containing silver ions while maintaining the temperature of the substrate and salt below 250° C.;

applying an electric field across the substrate at a voltage within the range from 50 to a few hundred volts/mm to exchange silver ions in the molten salt for sodium ions in the glass substrate to raise the index or refraction of the unmasked region of the substrate depthwise to form the waveguide while minimizing the reduction of silver so that the absorption of the waveguide is lower than it would otherwise be if the temperature were above 250° C.;

immersing the masked substrate in a second molten salt containing a low index ion whose mobility is lower than that of the silver ion in the substrate glass while maintaining the substrate and second molten salt below a temperature of 250° C.; and applying an electric field across the substrate to drive the silver ions further into the substrate while exchanging the low index ion for sodium to thereby bury the waveguide in the substrate to minimize scattering losses.

2. A method for fabricating, in a multicomponent glass substrate containing sodium ions, waveguides having sharp boundaries, said method comprising the steps of:

depositing on the surface of the glass substrate at least two silver strips to facilitate defining the lateral extent of the waveguide;

bringing the surface of the substrate with the silver strips into contact with a molten salt containing sodium;

applying a potential difference to cause the simultaneous diffusion of silver and sodium ions with the silver ions from the silver strips entering the glass and being transported toward the opposite side of the substrate to form the high index region of the waveguide while elsewhere sodium ions from the salt are exchanged for sodium ions in the glass substrate thus providing the waveguide with sharply defined boundaries due to the nearly equal mobilities of sodium and silver;

continuing to apply the electric field until the silver strips or consumed or until the integrated current reaches a predetermined value;

removing any remaining silver metal from the substrate; and reapplying the electric field to drive the silver ions deeper into the substrate to bury the waveguide.

3. The method of claim 2 wherein said molten salt and said substrate are maintained at a temperature below 250° C.

4. The method of claim 2 further including the step of immersing said substrate in a salt containing potassium ions before the second application of the electric field to perform a second ion exchange to bury the waveguide beneath the surface of the substrate.

* * * * *